United States Patent
Toyoda et al.

(10) Patent No.: US 7,664,319 B2
(45) Date of Patent: Feb. 16, 2010

(54) METHOD AND DEVICE FOR COLOR BALANCE CORRECTION, AND COMPUTER PRODUCT

(75) Inventors: Yuushi Toyoda, Kawasaki (JP); Masayoshi Shimizu, Kawasaki (JP); Hiroyuki Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/399,667

(22) Filed: Apr. 7, 2006

(65) Prior Publication Data

US 2006/0182338 A1    Aug. 17, 2006

Related U.S. Application Data

(63) Continuation of application No. PCT/JP03/15986, filed on Dec. 12, 2003.

(51) Int. Cl.
*G06K 9/38* (2006.01)
*G06K 9/40* (2006.01)
*H04N 1/46* (2006.01)
*G03F 3/10* (2006.01)

(52) U.S. Cl. .................. 382/167; 382/172; 382/274; 358/516; 358/522

(58) Field of Classification Search ............. 382/162, 382/164, 167, 168, 171, 163, 165, 169, 170, 382/172, 274; 358/518, 521, 522, 516, 519, 358/520

See application file for complete search history.

(56) References Cited

U.S. PATENT DOCUMENTS

| | | | | |
|---|---|---|---|---|
| 4,929,979 A | * | 5/1990 | Kimoto et al. | 355/38 |
| 5,046,118 A | * | 9/1991 | Ajewole et al. | 382/169 |
| 5,053,888 A | * | 10/1991 | Nomura | 358/3.22 |
| 5,410,418 A | | 4/1995 | Yonezawa | 358/456 |
| 5,426,517 A | * | 6/1995 | Schwartz | 358/520 |
| 5,680,477 A | * | 10/1997 | Asada | 382/169 |
| 5,748,773 A | * | 5/1998 | Tashiro et al. | 382/169 |
| 5,812,286 A | * | 9/1998 | Lin | 358/519 |
| 5,875,262 A | * | 2/1999 | Asada | 382/169 |
| 5,926,562 A | * | 7/1999 | Hyodo et al. | 382/167 |
| 5,943,045 A | * | 8/1999 | Ikeshoji et al. | 382/162 |

(Continued)

FOREIGN PATENT DOCUMENTS

DE    43 09 879    10/1993

(Continued)

OTHER PUBLICATIONS

European Patent Office Search Report dated Jul. 24, 2007.

(Continued)

*Primary Examiner*—Brian P Werner
*Assistant Examiner*—Anthony Mackowey
(74) *Attorney, Agent, or Firm*—Staas & Halsey LLP (57) ABSTRACT

A color balance correction device includes a histogram generating unit that generates histograms of a gradation level of pixels for R, G, and B; a decreasing-tendency-area identifying unit that identifies a range that the frequency tends to decrease first from a highlight side of each of histograms generated by the histogram generating unit as the catch light area; and a correction-amount calculating unit that calculates a correction amount of the color balance using data of pixels except for those in the catch light area specified by the decreasing-tendency-area identifying unit.

6 Claims, 12 Drawing Sheets

U.S. PATENT DOCUMENTS

| | | | |
|---|---|---|---|
| 6,198,844 B1 * | 3/2001 | Nomura | 382/168 |
| 6,236,751 B1 * | 5/2001 | Farrell | 382/168 |
| 6,463,173 B1 * | 10/2002 | Tretter | 382/168 |
| 6,493,468 B1 * | 12/2002 | Matsuura | 382/274 |
| 6,628,830 B1 * | 9/2003 | Yamazoe et al. | 382/168 |
| 6,694,051 B1 | 2/2004 | Yamazoe et al. | 382/167 |
| 6,771,815 B2 * | 8/2004 | Yang et al. | 382/169 |
| 6,839,460 B2 * | 1/2005 | Shirasawa | 382/167 |
| 6,873,729 B2 * | 3/2005 | Matsushima | 382/167 |
| 6,952,503 B2 * | 10/2005 | Matsuura | 382/274 |
| 7,006,668 B2 * | 2/2006 | Iguchi et al. | 382/108 |
| 7,057,768 B2 * | 6/2006 | Zaklika et al. | 358/1.9 |
| 7,167,597 B2 * | 1/2007 | Matsushima | 382/274 |
| 7,200,265 B2 * | 4/2007 | Imai | 382/168 |
| 7,570,836 B2 * | 8/2009 | Imai | 382/274 |
| 2001/0007599 A1 * | 7/2001 | Iguchi et al. | 382/274 |
| 2002/0024609 A1 * | 2/2002 | Matsushima | 348/362 |
| 2003/0002736 A1 * | 1/2003 | Maruoka et al. | 382/168 |
| 2003/0038984 A1 * | 2/2003 | Ohkawa | 358/462 |
| 2003/0099407 A1 * | 5/2003 | Matsushima | 382/274 |
| 2003/0231347 A1 * | 12/2003 | Imai | 358/2.1 |
| 2004/0066969 A1 * | 4/2004 | Aihara | 382/173 |
| 2004/0120599 A1 * | 6/2004 | Henley | 382/274 |
| 2004/0179732 A1 * | 9/2004 | Hayashi | 382/169 |
| 2004/0184673 A1 * | 9/2004 | Watanabe | 382/274 |
| 2004/0197022 A1 * | 10/2004 | Gonsalves | 382/167 |
| 2004/0208393 A1 * | 10/2004 | Nakakuki | 382/274 |

FOREIGN PATENT DOCUMENTS

| | | |
|---|---|---|
| EP | 0 576 003 | 12/1993 |
| EP | 0 957 629 | 11/1999 |
| JP | 6-22141 | 1/1994 |
| JP | 06-105152 | 4/1994 |
| JP | 6-178111 | 6/1994 |
| JP | 09-238257 | 9/1997 |
| JP | 11-154235 | 6/1999 |
| JP | 2000-13624 | 1/2000 |
| JP | 2002-101313 | 4/2002 |
| JP | 2003-125213 | 4/2003 |

OTHER PUBLICATIONS

Japanese Office Action issued on Sep. 9, 2008 in corresponding Japanese Patent Application No. 2005-511682.

* cited by examiner

| ROW NUMBER | COLUMN NUMBER | R | G | B | INVALID FLAG |
|---|---|---|---|---|---|
| 1 | 1 | 100 | 80 | 60 | 0 |
| 1 | 2 | 255 | 255 | 255 | 1 |
| ⋮ | | | | | |

FIG.4

| GRADATION LEVEL | 0 | 1 | 2 | ... | 255 | 0 | 1 | 2 | ... | 255 | 0 | 1 | 2 | ... | 255 |
|---|---|---|---|---|---|---|---|---|---|---|---|---|---|---|---|
| FREQUENCY | 0 | 100 | 300 | | 10000 | 0 | 200 | 500 | | 4000 | 0 | 300 | 400 | | 1000 |
| | R | | | | | G | | | | | B | | | | |

METHOD AND DEVICE FOR COLOR BALANCE CORRECTION, AND COMPUTER PRODUCT

This application is a continuing application, filed under 35 U.S.C. §111(a), of International Application PCT/JP2003/015986, filed Dec. 12, 2003.

BACKGROUND OF THE INVENTION

1. Field of the Invention

The present invention relates to a technology for calculating color balance of an image including a catch light area (highlight area where gradation has been lost).

2. Description of the Related Art

Recently, due to the spread of image-related apparatuses, such as digital cameras and color printers, and improvements in the performances of computers, consumers have had increased opportunities to process digital color images. However, qualities of color images obtained by the digital cameras do not always satisfy the users, namely, color cast images with lost color balances are not uncommon.

Various color balance correction techniques have been developed in the past for correcting the color cast. One of them detects catch light areas and excludes them to eliminate their effects, takes statistics for pixels, and performs correction based on the result of the statistics. For example, Japanese Patent Application Laid-open No. H9-238257 discloses a technique that excludes pixels with a brightness of a predetermined level or higher and a color of a predetermined level or lower as invalid pixels included in the catch light area, takes statistics for the remaining pixels, and corrects the color balance of the entire image based on the result of the statistics.

Figure 12:
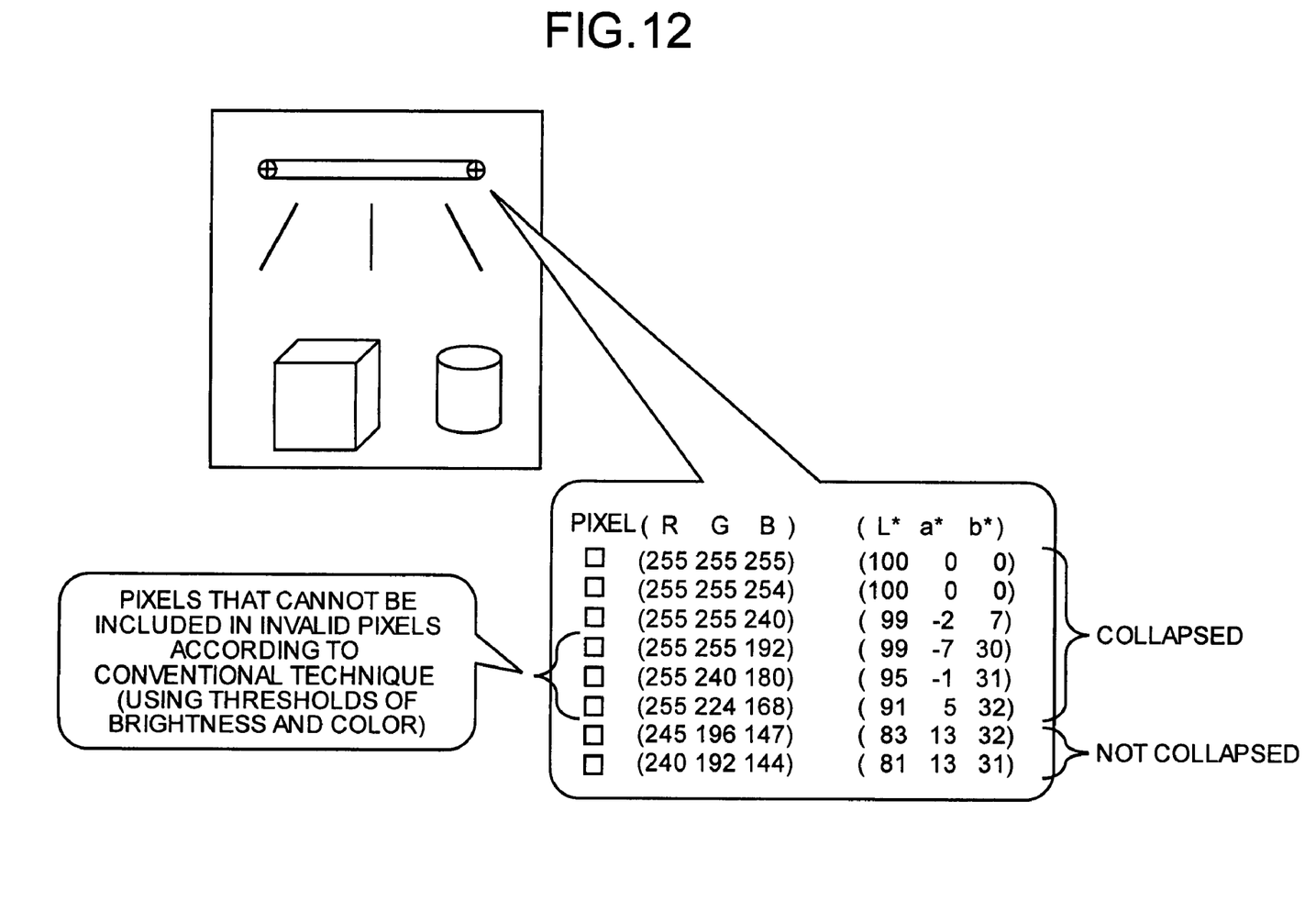
FIG. 12 is an explanatory diagram of a catch light area that can not be correctly identified with the conventional technique that uses brightness and color.

However, the conventional technique using the brightness and the color has a drawback that the catch light area cannot be identified accurately. FIG. 12 is an explanatory diagram of a catch light area that can not be identified with the conventional technique that uses the brightness and the color. An image shown in FIG. 12 is an image of a fluorescent lamp and two other objects irradiated with the fluorescent light of the fluorescent lamp. Due to the effect of the fluorescent light, the image is entirely occupied with yellow and the portion of the fluorescent lamp has almost collapsed.

The table below the image in FIG. 12 depicts, for each pixel, an RGB value and an L*a*b value. L* corresponds to brightness and a* and b* correspond to color. Among pixels of collapsed image, some of the pixels are not excluded as invalid pixels, because it is determined in the conventional technique that these pixels have color because the value of b* is 30 or more. In other words, at least in the example shown in FIG. 12, the catch light area cannot always be accurately identified based only on the L*a*b value.

SUMMARY OF THE INVENTION

It is an object of the present invention to at least solve the problems in the conventional technology.

According to an aspect of the present invention, computer-readable recording medium that stores therein a computer program that causes a computer to implement correcting a color balance of an image that includes a catch light area, the computer program causing the computer to execute generating histograms of a gradation level of each pixel in the image for each color; identifying an area where a frequency of a gradation level of the histogram generated at the generating tends to decrease first starting from a highest gradation of the gradation level as the catch light area; and calculating a correction amount of the color balance using pixels except for pixels included in the catch light area identified at the identifying.

According to another aspect of the present invention, a color balance correction device that corrects a color balance of an image that includes a catch light area, includes a histogram generating unit that generates histograms of a gradation level of each pixel in the image for each color; a decreasing-tendency-area identifying unit that identifies an area where a frequency of a gradation level of the histogram generated by the histogram generating unit tends to decrease first starting from highest gradation of the gradation level as the catch light area; and a correction-amount calculating unit that calculates a correction amount of the color balance using pixels except for pixels included in the catch light area identified by the decreasing-tendency-area identifying unit.

According to still another aspect of the present invention, a method of correcting a color balance of an image that includes a catch light area includes generating histograms of a gradation level of each pixel in the image for each color; identifying an area where a frequency of a gradation level of the histogram generated at the generating tends to decrease first starting from a highest gradation of the gradation level as the catch light area; and calculating a correction amount of the color balance using pixels except for pixels included in the catch light area identified at the identifying.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a color balance correction program, a color balance correction device, and a color balance correction method according to the present invention will be explained below in detail with reference to the accompanying drawings.

Figure 1:
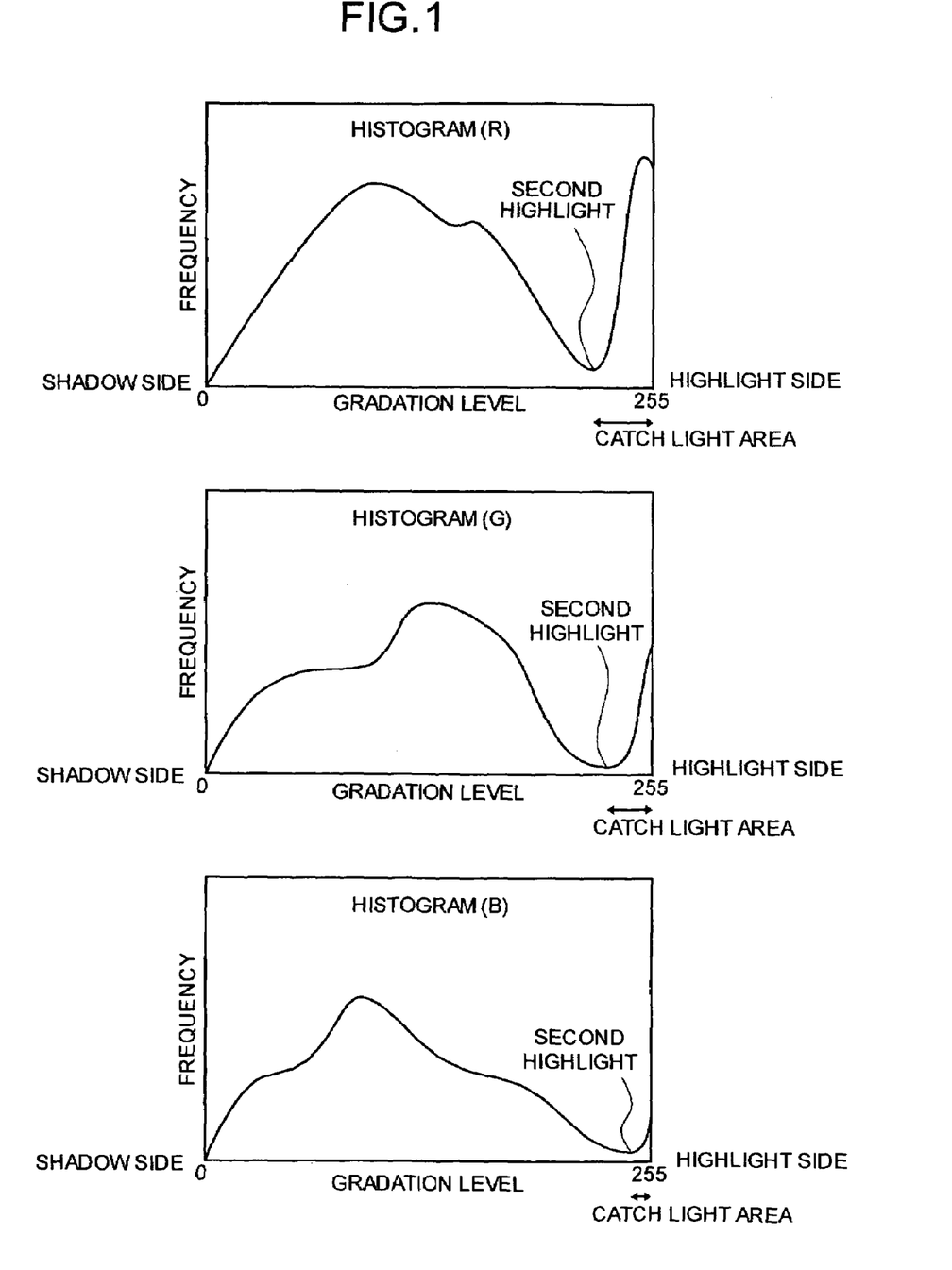
FIG. 1 is a schematic for explaining a method of identifying a catch light area by a color balance correction device according to an embodiment of the present invention.

A method of identifying a catch light area by a color balance correction device according to one embodiment is explained first. FIG. 1 is a schematic for explaining the method of identifying a catch light area by a color balance correction device according to the embodiment.

FIG. 1 depicts histograms of the gradation level (0 to 255) of pixels that make up an image for red (R), green (G), and blue (B). As shown in FIG. 1, the color balance correction device according to this embodiment identifies an area in these histograms where a frequency of the gradation level decreases first, staring from gradation level 255 (which is the highlight side) and going toward gradation level 0 (which is the shadow side) as a catch light area. The left end of the catch light area is referred to as a second highlight.

When any of R, G, and B value of a pixel falls in the catch light area, the color balance correction device according to the embodiment determines that pixel as an invalid pixel, that is, a pixel that is in the catch light area, and does not use that pixel in the calculation of correction amount of the color balance.

The color balance correction device according to the embodiment identifies, in the histograms of the R, G, and B gradation levels (0 to 255), the area where the frequency of the gradation level tends to decrease first starting from gradation level 255 as the catch light area. The color balance correction device thus can accurately identify the catch light area and invalid pixels to be excluded from the calculation of the correction amount of the color balance.

Figure 2:
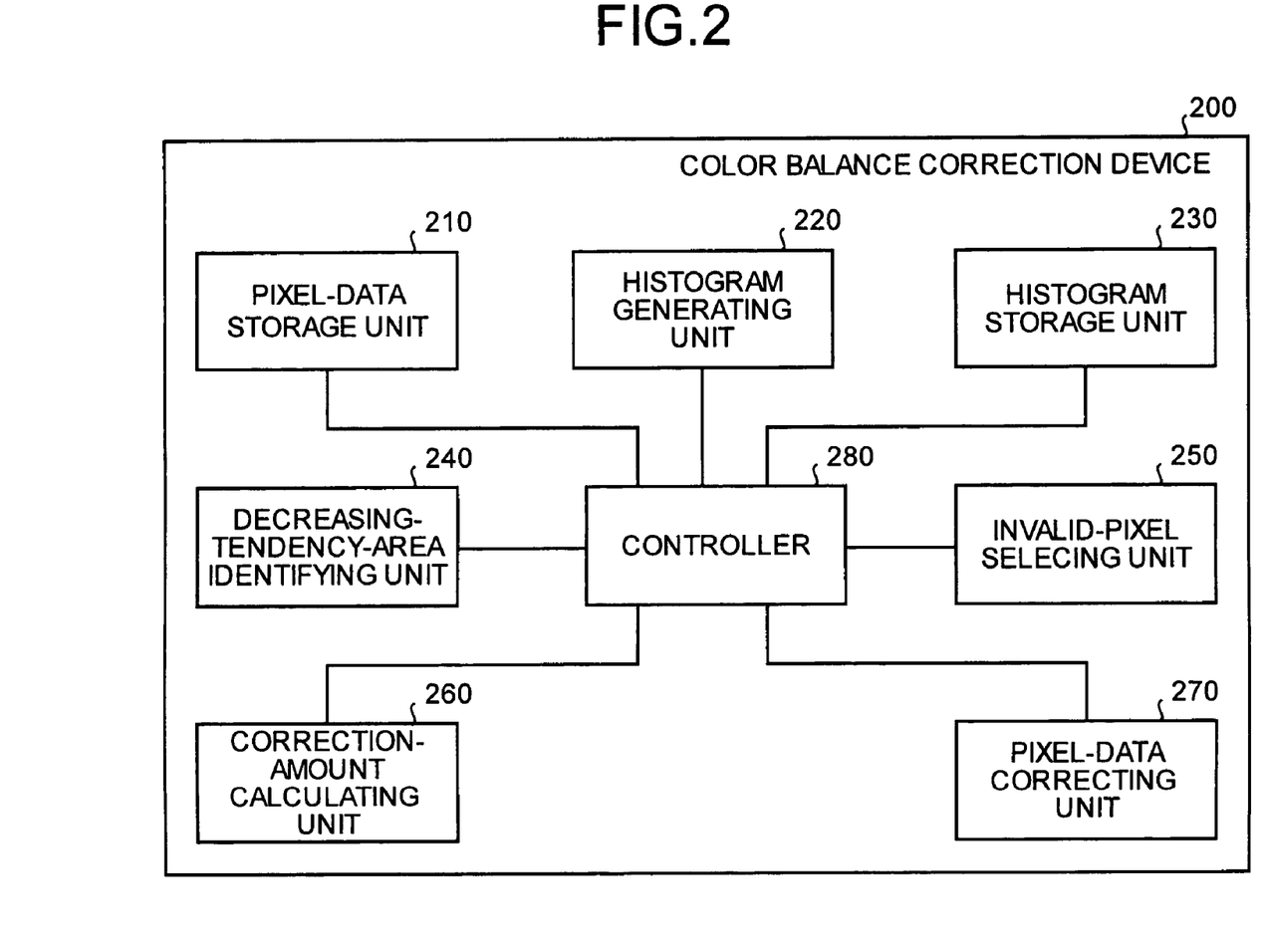
FIG. 2 is a functional block diagram of the color balance correction device.

A structure of the color balance correction device according to the embodiment is explained next. FIG. 2 is a functional block diagram of the color balance correction device 200 according to the embodiment. The color balance correction device 200 includes a pixel-data storage unit 210, a histogram generating unit 220, a histogram storage unit 230, a decreasing-tendency-area identifying unit 240, an invalid-pixel selecting unit 250, a correction-amount calculating unit 260, a pixel-data correcting unit 270, and a controller 280.

Figure 3:
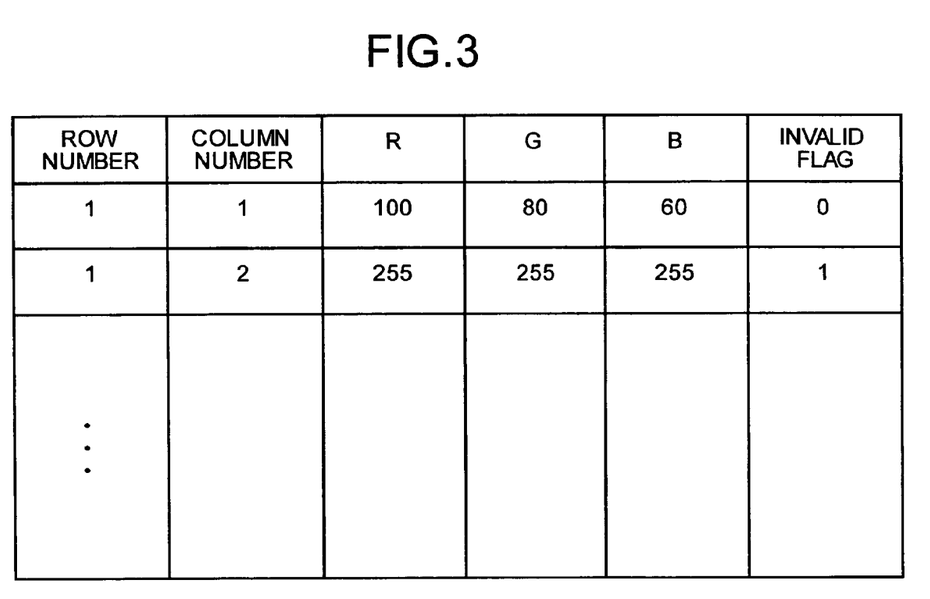
FIG. 3 is an example of contents of a pixel-data storage unit shown in FIG. 2.

The pixel-data storage unit 210 stores therein data of pixels that make up an image. FIG. 3 is an example of contents of the pixel-data storage unit 210. The pixel data includes, for each pixel, a row number and a column number for defining a pixel position of the pixel in the image; R, G, and B gradation levels; and an invalid flag that indicates whether the pixel is valid or invalid for calculating the correction amount of the color balance.

If the pixel is valid, the invalid flag is "0". If the pixel is invalid, the invalid flag is "1". "0" is the default value of the invalid flag.

For example, a pixel at a pixel position defined by row number "1" and column number "1" has R, G, and B gradation levels of "100", "80", and "60", respectively, and its invalid flag is "0" which means that the pixel is "valid" for the calculation of the correction amount of the color balance. Similarly, a pixel at a pixel position defined by row number "1" and column number "2" has R, G, and B gradation levels of "255", "255", and "255", respectively, and its invalid flag is "1" which means that the pixel is "invalid" for the calculation of the correction amount of the color balance.

The histogram generating unit 220 generates histograms of the R, G, and B gradation levels by using the pixel data stored in the pixel-data storage unit 210. The histogram generating unit 220 can be configured to generate the histograms using all of the pixel data stored in the pixel-data storage unit 210 or using only the data of valid pixels.

Figure 4:
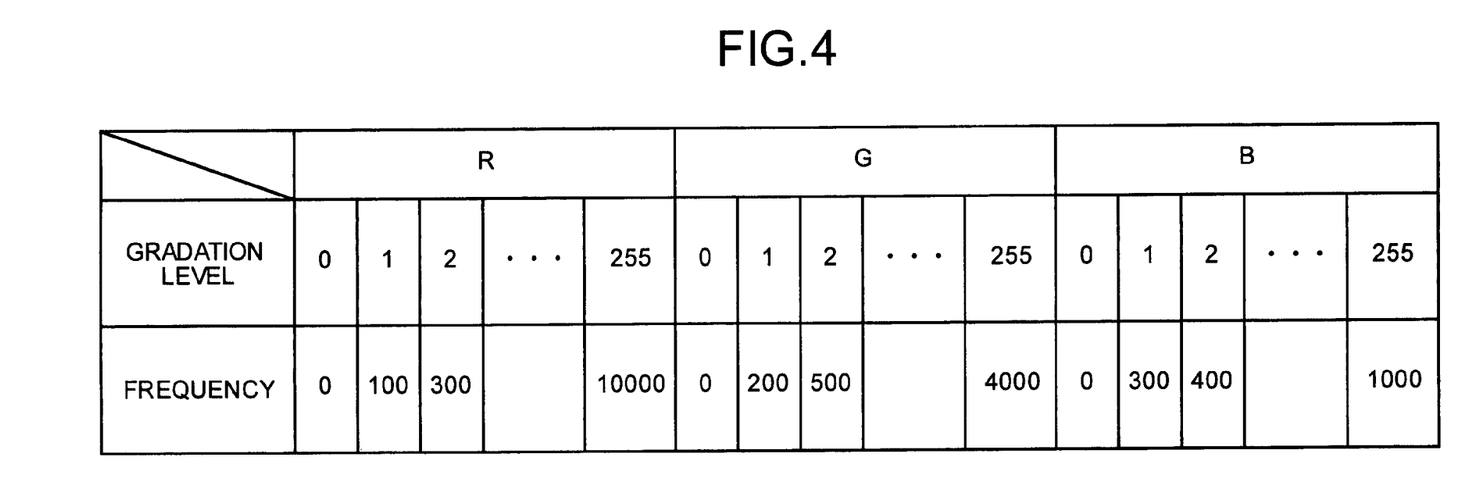
FIG. 4 is an example of contents of a histogram storage unit shown in FIG. 2.

The histogram storage unit 230 stores therein the data of the histograms generated by the histogram generating unit 220. FIG. 4 is an example of contents of the histogram storage unit 230. The histogram data includes frequency that is the number of pixels having a certain gradation level for each of R, G, and B. For example, the number of pixels with an R gradation level of "0" is "0", the number of pixels with an R gradation level of "1" is "100", and the number of pixels with an R gradation level of "2" is "300".

The decreasing-tendency-area identifying unit 240 identifies based on the histogram data stored in the histogram storage unit 230, a frequency decreasing tendency range that the frequency of the gradation level tends to decrease first from the gradation level of 255, i.e., from the high light side as a catch light area. The decreasing-tendency-area identifying unit 240 identifies the catch light area in the histograms for each of R, G, and B.

The catch light area can be accurately identified by the decreasing-tendency-area identifying unit 240, by using the histogram data, the frequency decreasing tendency range that the frequency of the gradation level tends to decrease first from the high side as the catch light area. The histogram data used by the decreasing-tendency-area identifying unit 240 is data of histograms generated by data of all pixels.

The invalid-pixel selecting unit 250 selects, as invalid pixels, pixels that belong to the catch light area that is identified by the decreasing-tendency-area identifying unit 240. Specifically, the invalid-pixel selecting unit 250 sets the invalid flag in the pixel-data storage unit 210 to "1" for pixels belonging to any of the R, G, and B catch light areas.

The correction-amount calculating unit 260 calculates the correction amount of the color balance by using pixel data of valid pixels. Specifically, the correction-amount calculating unit 260 generates R, G, and B histograms with the histogram generating unit 220 by using the data of pixels with the invalid flag of "0" in the pixel-data storage unit 210. Values obtained by subtracting the gradation levels of pixels in the top 0.5% of the histograms from the maximum gradation level, i.e., 255 are determined as correction amounts Rc, Gc, and Bc for R, G, and B values, respectively.

While it has been mentioned above to calculate the correction amounts Rc, Gc, and Bc by using the gradation levels of pixels in the top 0.5% of the histograms, any other method can be used to calculate the correction values.

The pixel-data correcting unit 270 corrects R, G, and B values for each pixel stored in the pixel-data storage unit 210 by using the correction amounts RC, GC, and BC calculated by the correction-amount calculating unit 260.

Figure 5:
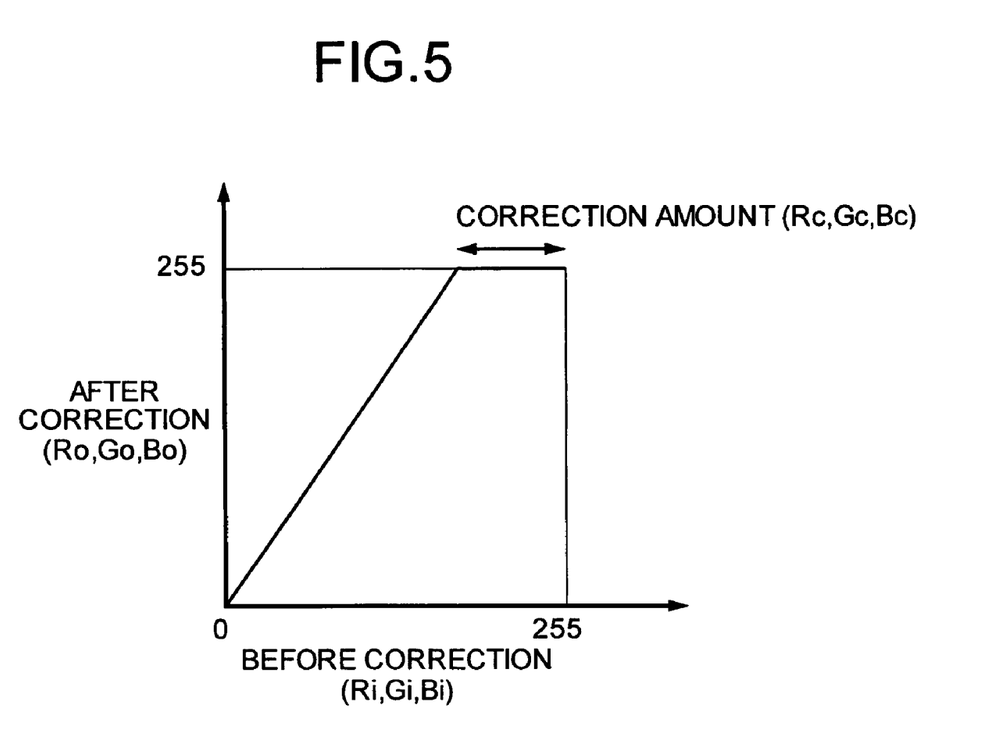
FIG. 5 is a schematic for explaining the principle of color balance/highlight correction.

FIG. 5 is a schematic for explaining the principle of color balance/highlight correction. As shown in FIG. 5, the pixel-data correcting unit 270 corrects Ri (0 to 255−RC) serving as an R value before correction, Gi (0 to 255−GC) serving as a G value before correction, and Bi (=0 to 255−BC) serving as a B value before correction into Ro serving as an R value after correction, Go serving as a G value after correction, and Bo serving as a B value after correction, respectively by the following proportional operation.

$Ro = Ri \times 255/(255-Rc)$ $Go = Gi \times 255/(255-Gc)$ $Bo = Bi \times 255/(255-Bc)$ By the correction, (255−Rc, 255−Gc, 255−Bc) is converted into (255, 255, 255) (i.e., white). For example, if (255−Rc, 255−Gc, 255−Bc) has any color (greenish color), the color is corrected so as to be white. The greenish color is thus vanished. If the greenish color corresponds to a color balance shift (hereinafter, generally "color cast"), correction is properly performed.

If (255−Rc, 255−Gc, 255−Bc) has a darker color with a gradation level of 255 or lower, this color is corrected to be white, and the darker color is changed to white. If the highlight is not white but a darker color, this color corresponding to the highlight that needs to be whitened is properly corrected.

The controller 280 controls the entire color balance correction device 200. Specifically, the controller 280 makes the color balance correction device 200 function as a device by shifting controls of the function units and passing data between the function units and the storage units.

Figure 6:
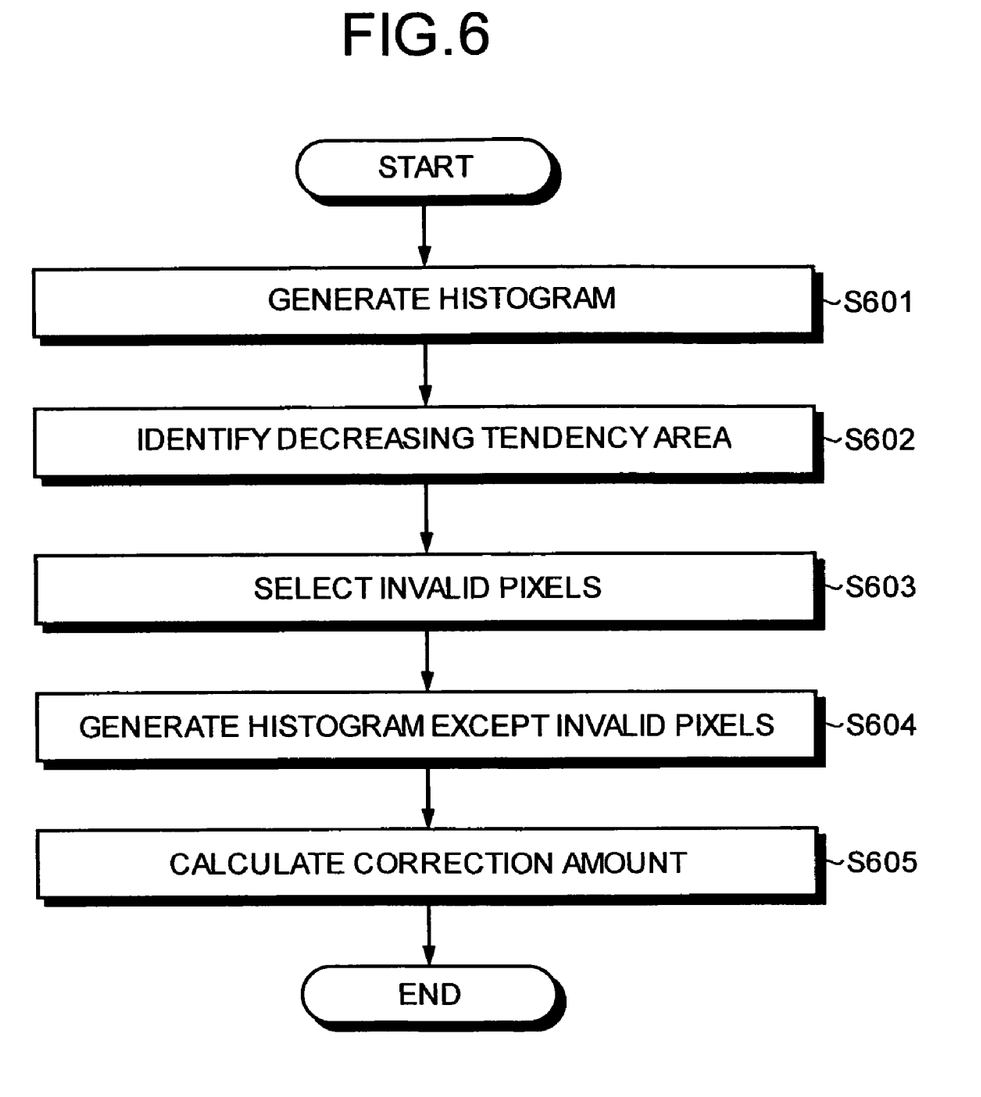
FIG. 6 is a flowchart of a correction amount calculating process performed by the color balance correction device.

A process procedure of correction amount calculation performed by the color balance correction device 200 according to the embodiment is explained next. FIG. 6 is a flowchart of the correction amount calculating process procedure performed by the color balance correction device 200 according to the embodiment.

As shown in FIG. 6, in the color balance correction device 200, the histogram generating unit 220 generates three histograms of R, G, and B gradation levels by using R, G, and B values for all pixels stored in the pixel-data storage unit 210 (step S601) and stores the histograms in the histogram storage unit 230.

The decreasing-tendency-area identifying unit 240 reads each of the histograms stored in the histogram storage unit 230 and identifies an area where the frequency of the gradation level tends to decrease first from the high side as the catch light area (step S602). The invalid-pixel selecting unit 250 selects pixels in any of the respective catch light areas as invalid pixels (step S603), and sets invalid flags of the selected pixels in the pixel-data storage unit 210 to "1".

The correction-amount calculating unit 260 generates three histograms for R, G, and B that the invalid pixels are excluded by using the histogram generating unit 220 (step S604) and calculates values obtained by subtracting the gradation levels of pixels in the top 0.5% of the generated histograms from 255 as the correction amounts Rc, Gc, and Bc (step S605).

By the decreasing-tendency-area identifying unit 240 specifying, by using the histograms stored in the histogram storage unit 230, the area where the frequency of the gradation level tends to decrease first from the high side as the catch light area, the catch light area is precisely specified. The correction amount of the color balance is thus accurately calculated.

Figure 7:
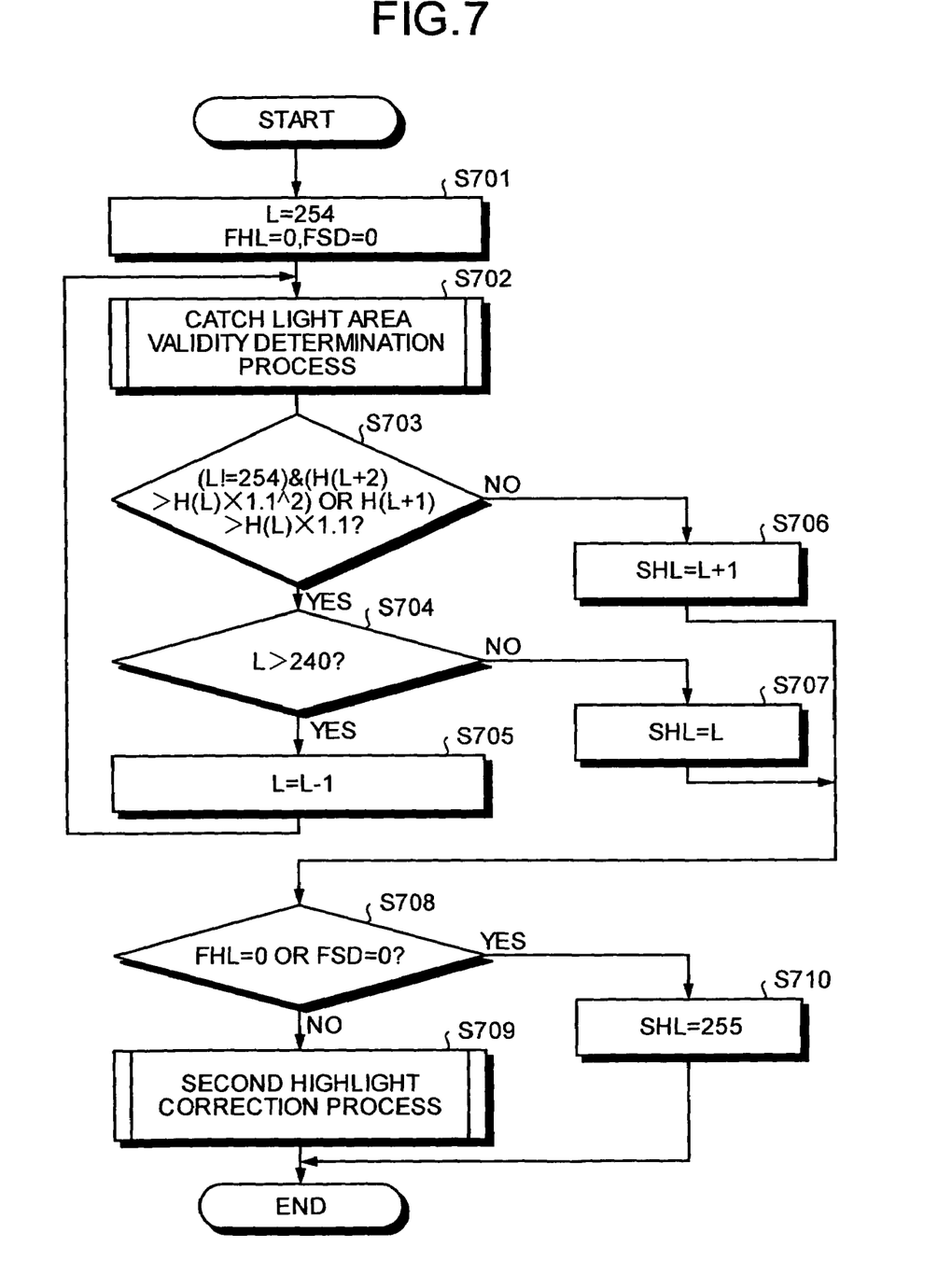
FIG. 7 is a flowchart of a process procedure performed by a decreasing-tendency-area identifying unit shown in FIG. 2.

A process procedure performed by the decreasing-tendency-area identifying unit 240 is explained next. FIG. 7 is a flowchart of the process performed by the decreasing-tendency-area identifying unit 240. The process procedure performed by the decreasing-tendency-area identifying unit 240 corresponds to a process in step S602 shown in FIG. 6.

As shown in FIG. 7, the decreasing-tendency-area identifying unit 240 initializes a gradation level L that is focused on in the histogram so as to be L=254 and FHL and FSD serving as flags used for determining whether there is a valid catch light area so as to be FHL=0 and FSD=0 (step S701).

The FHL is set to "1" when the frequency of the highlight is higher than a certain value. The FSD is set to "1" when the frequency of the second highlight is lower than a certain value. If the frequency of the highlight is higher than the certain value and the frequency of the second highlight is lower than the certain value, it is determined by a catch light area validity determining process (step S702) that there is a valid catch light area and these flags are set to "1".

By comparing frequencies $H(L)$, $H(L+1)$, and $H(L+2)$ of three gradation levels, it is determined whether the frequency tends to decrease. Specifically, if L is "254", it is determined whether the frequency tends to decrease by determining whether $H(L+1)$ is larger than $H(L) \times 1.1$. If L is not "254", it is determined that the frequency tends to decrease when $H(L+2)$ is larger than $H(L) \times 1.1^2$ or $H(L+1)$ is larger than $H(L) \times 1.1$ (step S703). $1.1^2$ indicates 1.1 squared.

If the frequency tends to decrease, it is determined whether L is larger than "240" (step S704). If L is larger than "240", "1" is subtracted from L (step S705) and the process returns to step S702. It is then determined whether the frequency tends to decrease.

If the frequency does not tend to decrease, the second highlight is specified. The gradation level SHL of the second highlight is set to "L+1" (step S706). If L is not larger than "240", the SHL is set to L as the lower limit of the second highlight (step S707).

It is determined whether the FHL and the FSD are set to "1", i.e., whether there is a valid catch light area (step S708). If there is a valid catch light area, a second highlight correcting process that corrects the gradation level SHL of the second highlight depending on whether the frequency tends to increase after the specified second highlight is performed (step S709). If there is not any valid catch light area, the SHL is determined as 255 and it is determined that there is no second highlight (step S710).

The decreasing-tendency-area identifying unit 240 compares the frequency $H(L)$ of the gradation level to be focused on with the frequency $H(L+1)$ of the gradation level that is one level higher than $H(L)$ and the frequency $H(L+2)$ of the gradation level that is two levels higher than $H(L)$. Depending on the frequencies to be compared with, a certain constant is multiplied by the frequency of the gradation level to be focused on. If the frequency of the gradation level to be focused on is lower than that of the gradation level that is one level higher and that of the gradation level that is two levels higher, it is determined that the frequency tends to decrease. The gradation level L to be focused on is then decreased by one level, and compared again to the frequency of the gradation level that is one level higher and the frequency of the gradation level that is two levels higher.

The reason why the frequency $H(L)$ of the gradation level to be focused on is compared to two frequencies $H(L+1)$ and $H(L+2)$ of the gradation level is not so as to be affected by slight variations in the histogram. The process can be performed by referring to and comparing only the frequency $H(L+1)$ that is one level higher. While a process speed is increased, a detection ability is decreased. It can be determined whether the frequency tends to decrease by comparing more frequencies of the gradation level.

The process is stopped using a threshold so that the decreasing tendency with a certain level or lower does not last. By the stop process, detection of the second highlight with an extremely low level is prevented. In the stop process, determination can be made by using not the threshold of the gradation level but a threshold of an accumulated number of frequencies from the highlight side.

While 1.1 and $1.1^2$ are used as the constant to be multiplied by the frequency of the gradation level L when it is determined whether the frequency tends to decrease, other values can be used instead of these values. A value other than "240" can be used for the lower limit of the gradation level SHL of the second highlight.

The decreasing-tendency-area identifying unit 240 compares frequencies of three neighbor gradation levels, and specifies the range that the frequency tends to decrease. The catch light area is thus specified precisely.

While the catch light area validity determining process (step S702) and the second highlight correcting process (step S709) can be omitted, the catch light area can be identified more accurately by these processes.

Figure 8:
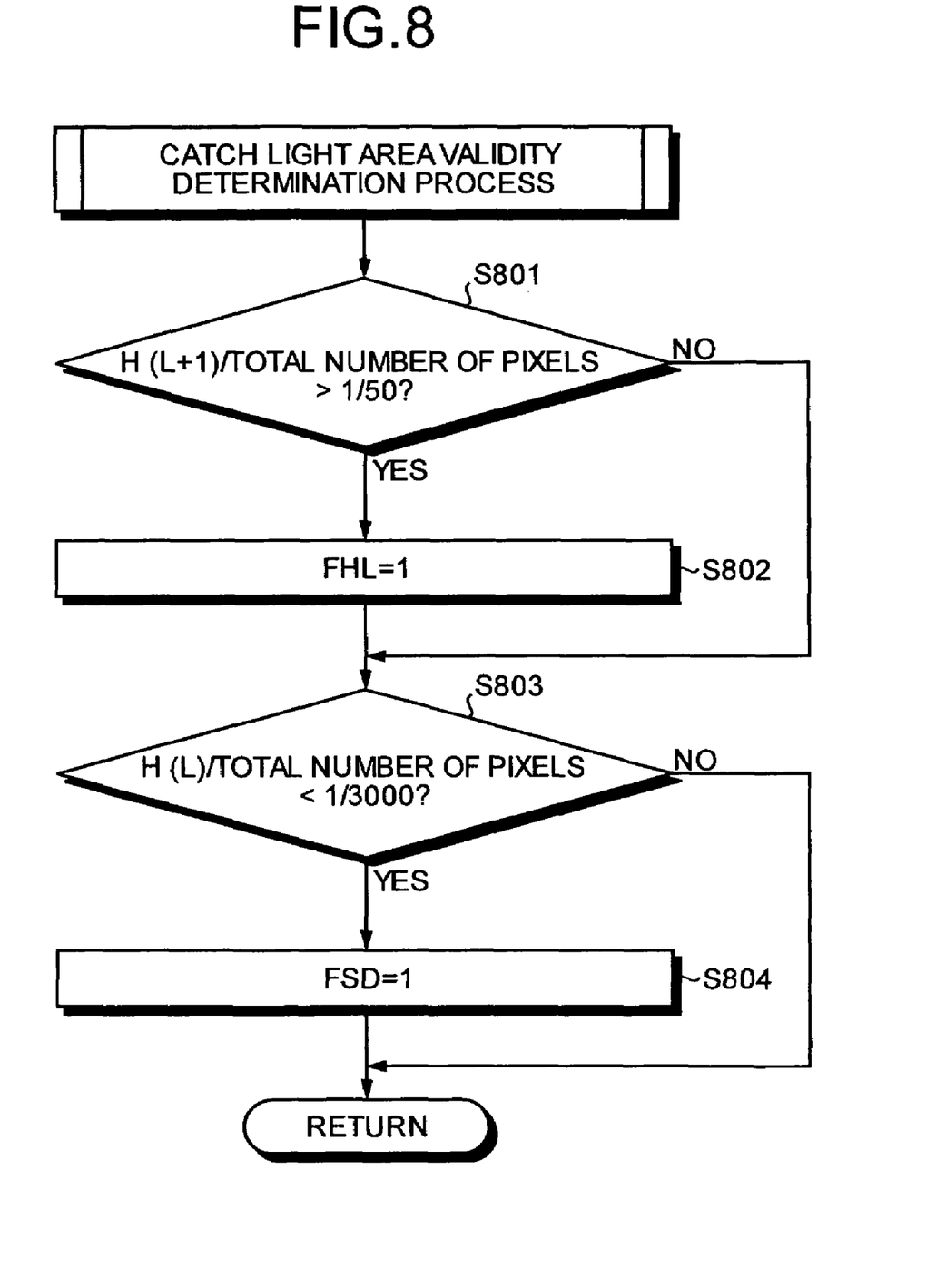
FIG. 8 is a detailed flowchart of a catch light area validity determination process shown in FIG. 7.

The catch light area validity determination process (step S702) shown in FIG. 7 is explained in more detail next. FIG. 8 is a detailed flowchart of the catch light area validity determination process.

As shown in FIG. 8, the catch light area validity determining process determines whether an inequality H(L+1)/the total number of pixels>1/50 is satisfied, i.e., whether the ratio of the frequency of the gradation level "L+1" to the total number of pixels is larger than 1/50 (step S801). If the inequality H(L+1)/the total number of pixels>1/50 is satisfied, it is determined that there is a valid highlight and the FHL is set to "1" (step S802).

In the catch light area validity determining process, it is determined whether an inequality H(L)/the total number of pixels<1/3000 is satisfied, i.e., whether the ratio of the frequency of the gradation level L to the total number of pixels is smaller than 1/3000 (step S803). If the inequality H(L)/the total number of pixels<1/3000 is satisfied, it is determined that there is a/second highlight and the FSD is set to "1" (step S804).

In the catch light area validity determining process, whether there is a highlight and a second highlight is determined using the ratio of the frequency of the histogram to the total number of pixels. Detection of ambiguous highlight and second highlight is thus prevented.

While 1/50 and 1/3000 are used as the constant when it is determined whether there is a highlight and a second highlight in the catch light area validity determining process, other values can be used as the constant. It can be determined whether there is a highlight and a second highlight using the frequency instead of the ratio of the frequency of the gradation level to the total number of pixels.

Figure 9:
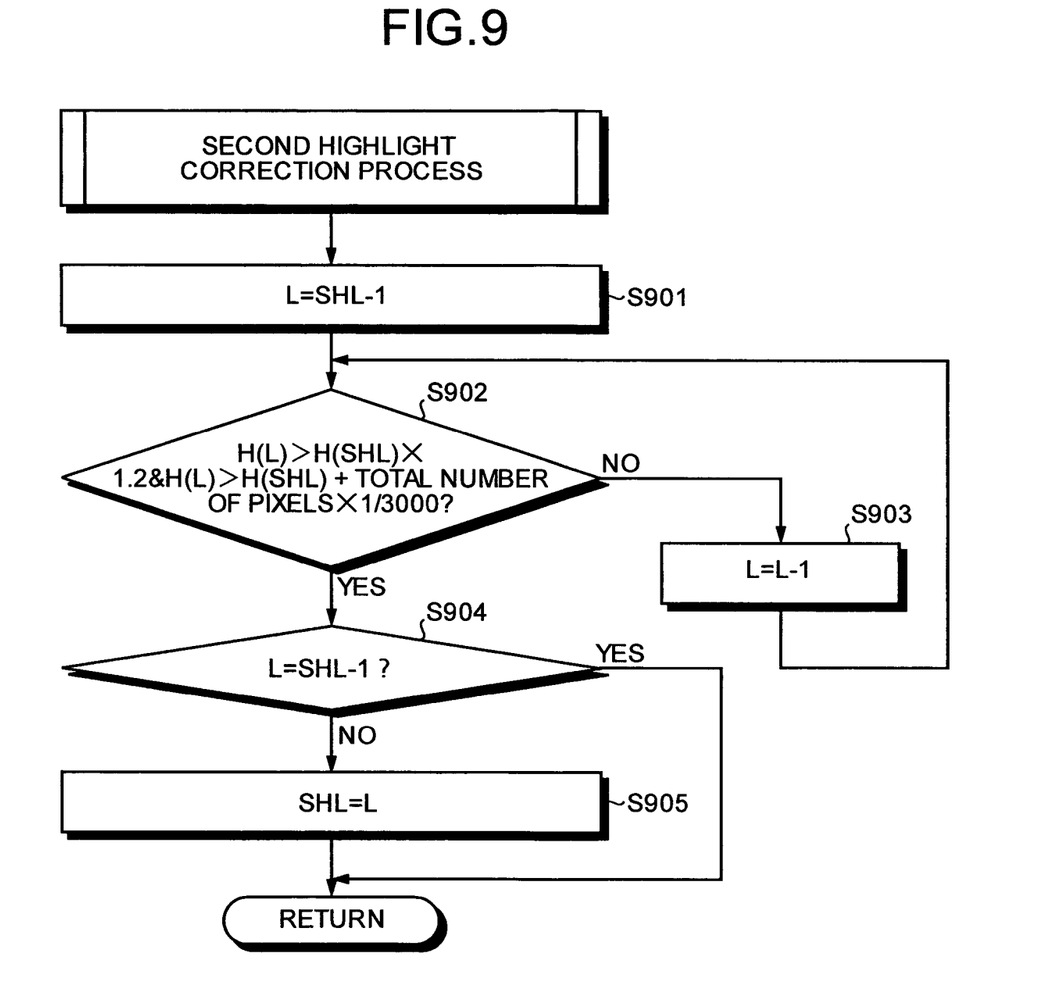
FIG. 9 is a detailed flowchart of a second highlight correction process shown in FIG. 7.

The second highlight correction process (step S709) shown in FIG. 7 is explained in more detail next. FIG. 9 is a detailed flowchart of the second highlight correction shown in FIG. 7.

As shown in FIG. 9, in the second highlight correcting process, the gradation level that is one level lower than the gradation level SHL of the second highlight is initialized as the gradation level L to be focused on (step S901). It is then determined whether an inequality H(L)>H(SHL)×1.2&H(L)>H(SHL)+the total number of pixels×1/3000 is satisfied, i.e., whether the frequency of the gradation level L to be focused on is 1.2 times larger than the frequency of the second highlight, and the frequency of the gradation level L to be focused on is larger than the frequency of the second highlight+the total number of pixels×1/3000 (step S902).

As a result, if the inequality H(L)>H(SHL)×1.2&H(L)>H(SHL)+the total number of pixels×1/3000 is not satisfied, it is determined that the frequency does not tend to increase after the catch light area tends to decrease. To correct the gradation level of the second highlight, the gradation level L to be focused on is decreased by one level (step S903). The process reruns to step S902 and determines whether the frequency tends to increase.

On the other hand, if the inequality H(L)>H(SHL)×1.2&H(L)>H(SHL)+the total number of pixels×1/3000 is satisfied, it is determined that the frequency tends to increase. Whether L is still the initial value is determined (step S904). If L is not the initial value, the gradation level SHL of the second highlight is corrected to L (step S905). If L is still the initial value, the second highlight does not have to be corrected, and the process ends.

In the second highlight correcting process, it is determined whether the slope of the histogram from the shadow side gradation level of the frequency decreasing range toward the shadow side gradation level tends to increase to correct the second highlight. Namely, the gradation level L that is one level lower than the gradation level SHL of the second highlight is focused on. If the frequency of L to be focused on is not larger than the frequency of the second highlight at a certain rate, the gradation level L to be focused on is decreased by one level and the comparison process is repeated. While the process is repeated, if the frequency of the gradation level L to be focused on is larger than the frequency of the second highlight at the certain rate, the comparison process ends. The gradation level L to be focused on is determined as the gradation level of the second highlight.

The second highlight correcting process determines whether the slope of the histogram from the second highlight to the shadow side tends to increase to correct the second highlight. The second highlight is thus reliably detected.

While 1.2 and 1/3000 are used as the constant when it is determined whether the slope of the histogram from the second highlight to the shadow side tends to increase in the second highlight correcting process, other values can be used as the constant. While the gradation level L that is one level lower than the gradation level SHL of the second highlight is focused on and the frequency of L to be focused on and the frequency of the second highlight are used, frequencies of more gradation levels can be compared and whether the slope of the histogram from the second highlight to the shadow side tends to increase can be determined.

As described above, according to the embodiment, the histogram generating unit 220 generates histograms of the gradation level of pixels for R, G, and B. The decreasing-tendency-area identifying unit 240 specifies the range that the frequency tends to decrease first from the highlight side of each of the histograms generated by the histogram generating unit 220 as the catch light area. The correction-amount calculating unit 260 calculates the correction amount of the color balance using the data of pixels except for those in the catch light area specified by the decreasing-tendency-area identifying unit 240. Accordingly, the catch light area can be identified accurately, and the correction amount can be calculated accurately.

While the color balance correction device is explained in this embodiment, by implementing the configuration of the color balance correction device by software, a color balance correction program with the same function as that of the color balance correction device can be accomplished. A computer system that executes the color balance correction program is explained.

Figure 10:
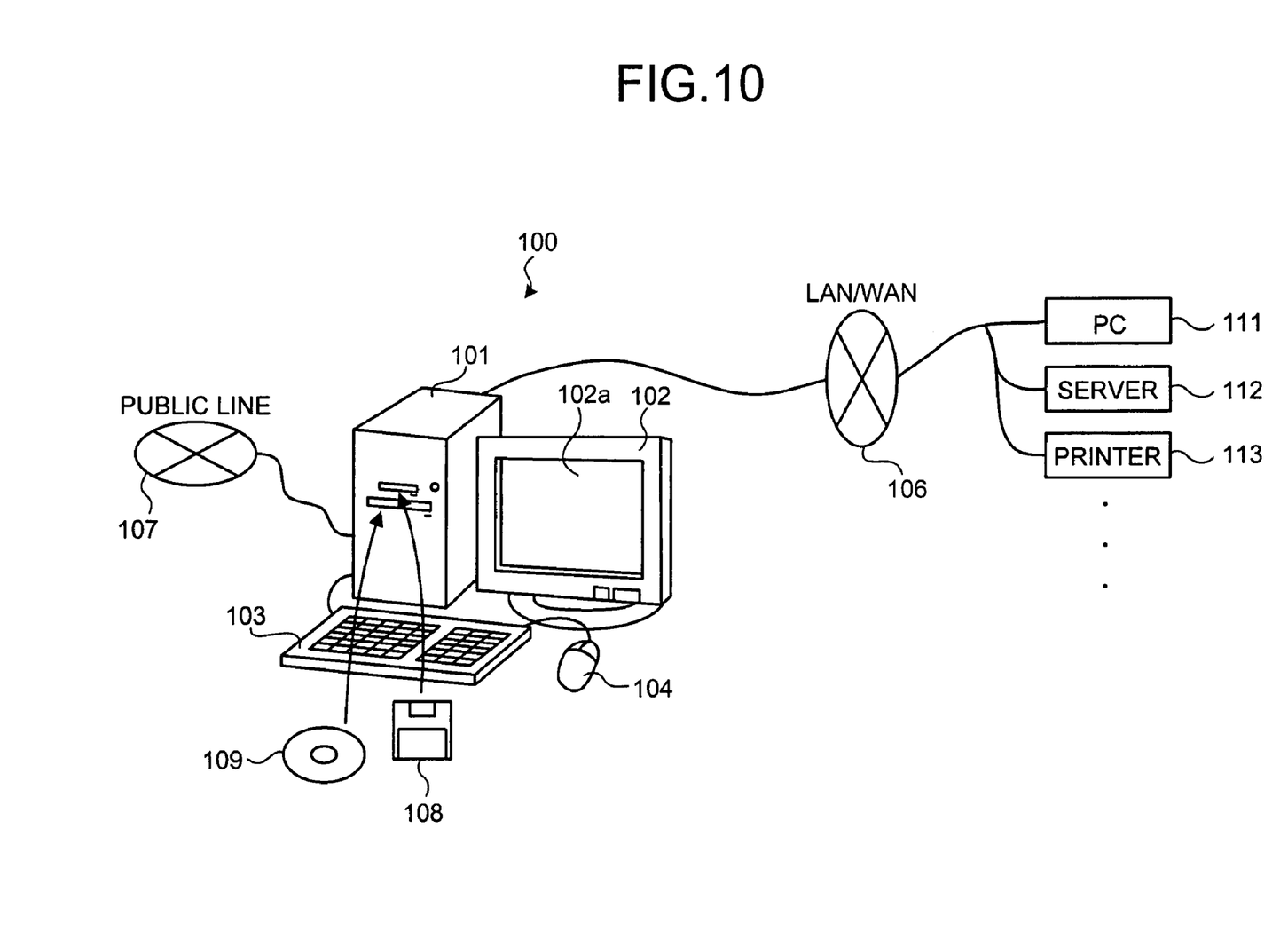
FIG. 10 is a computer system that executes a color balance correction program according to the embodiment.

FIG. 10 is a computer system that executes the color balance correction program according to this embodiment. As shown in FIG. 10, the computer system 100 includes a main unit 101, a display 102 that displays information on a display screen 102a according to instructions from the main unit 101, a keyboard 103 for inputting various information to the computer system 100, a mouse 104 for designating any position on the display screen 102a of the display 102, a LAN interface for connecting to a LAN 106 or a wide area network (WAN), and a modem for connecting to a public line 107. The LAN 106 connects the computer system 100 to other computer system (PC) 111, a server 112, and a printer 113.

Figure 11:
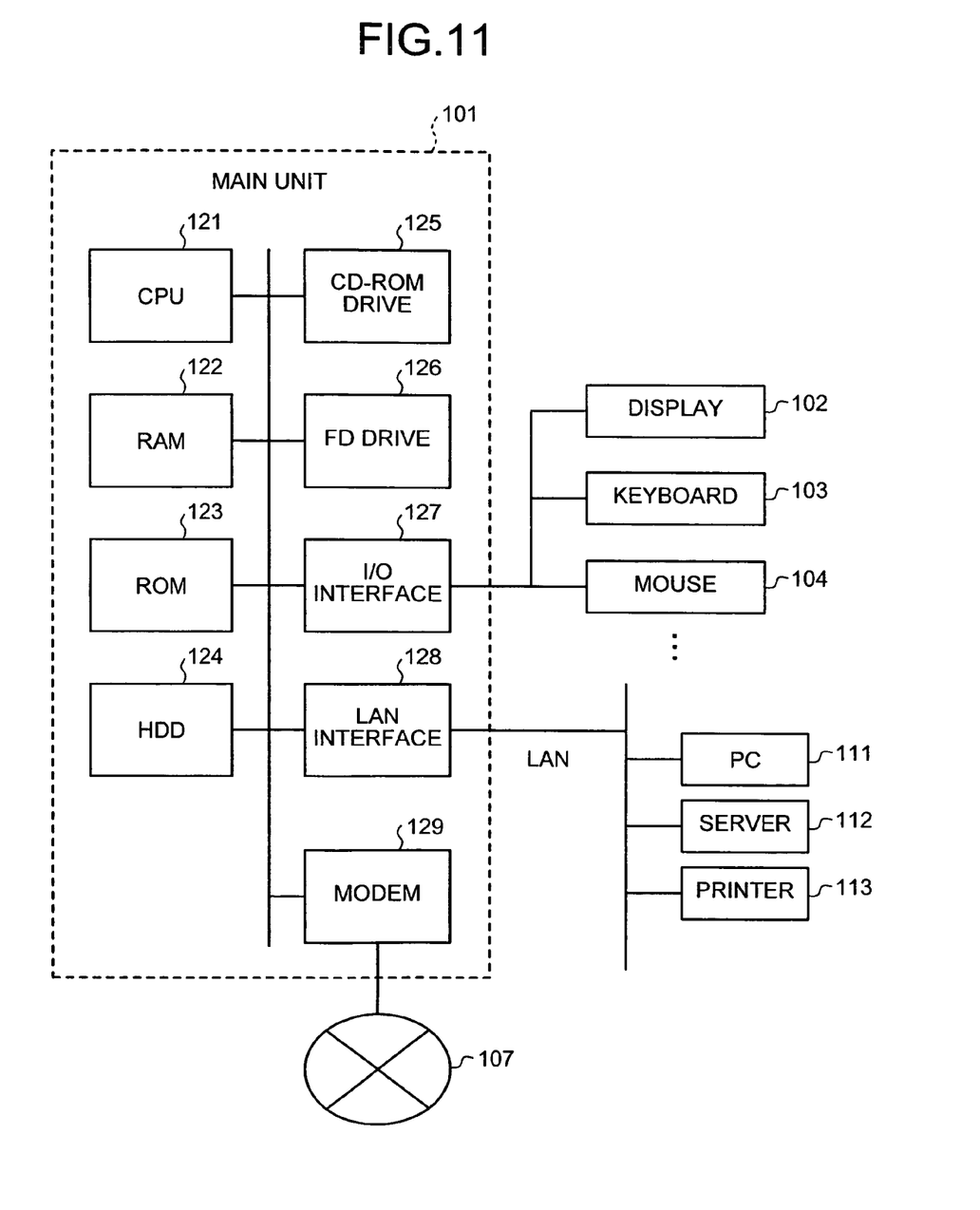
FIG. 11 is a functional block diagram of a structure of a main unit shown in FIG. 10.

FIG. 11 is a functional block diagram of a structure of the main unit 101 shown in FIG. 10. As shown in FIG. 11, the main unit 101 has a CPU 121, a RAM 122, a ROM 123, a hard disk drive (HDD) 124, a CD-ROM drive 125, an FD drive 126, an I/O interface 127, a LAN interface 128, and a modem 129.

The color balance correction program executed in the computer system 100 is stored in portable storage media such as a floppy disk (FD) 108, a CD-ROM 109, a DVD disk, a magneto-optical disk, and an IC card, read from such storage media, and installed in the computer system 100.

Alternatively, the color balance correction program can be stored in the databases of the server 112 and the other computer system (PC) 111 connected via the LAN interface 128 to the computer system 100, read from these databases and installed in the computer system 100.

The installed color balance correction program is stored in the HDD 124 and executed by the CPU 121 utilizing the RAM 122 and the ROM 123.

As explained above, according to an aspect, histograms of the gradation level of pixels that make up an image are generated for the respective color components. An area where the frequency of the gradation level of each of the generated histograms tends to decrease first from the high side is specified as the catch light area, and the correction amount of the color balance is calculated using pixels except for ones included in the specified catch light area. Accordingly, the catch light area is precisely specified, and the color balance is thus accurately corrected.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program that causes a computer to implement correcting a color balance of an image that includes a catch light area, the computer program causing the computer to execute:

generating histograms of a gradation level of each pixel in the image for each color;

identifying an area where a frequency of a gradation level of the histogram generated at the generating tends to decrease first starting from a highest gradation of the gradation level, as the catch light area, the identifying includes determining validity of the catch light area by checking whether a frequency of gradation level in frequency decreasing area of the catch light area is larger than a first predetermined threshold value for determining if there is a valid catch light area or not, and by checking whether a frequency of a gradation level in frequency decreasing area of the catch light area is smaller than a second predetermined threshold value; and calculating a correction amount of the color balance using pixels except for pixels included in the catch light area identified at the identifying.

2. The computer-readable recording medium according to claim 1, wherein the identifying includes identifying the catch light area by using a plurality of slopes of the histograms generated at the generating.

3. The computer-readable recording medium according to claim 2, wherein the lowest gradation level of the catch light area identified at the identifying is equal to or higher than a predetermined lower limit of a second highlight.

4. The computer-readable recording medium according to claim 2, wherein a frequency of a histogram included in the catch light area identified at the identifying is larger than a predetermined value.

5. The computer-readable recording medium according to claim 1, wherein if a result of comparison between a frequency of a gradation level that is one level lower than the lowest gradation level and the frequency of the lowest gradation level of the catch light area identified at the identifying is smaller than a predetermined value, the color balance correction program further causes the computer to execute correcting the catch light area until the result of comparison is equal to or larger than the predetermined value.

6. A computer-implemented method of correcting a color balance of an image that includes a catch light area, the method comprising:

generating histograms of a gradation level of each pixel in the image for each color;

identifying an area where a frequency of a gradation level of the histogram generated at the generating tends to decrease first starting from a highest gradation of the gradation level as the catch light area, the identifying determines validity of the catch light area by checking whether a frequency of a gradation level in frequency decreasing area of the catch light area is larger than a first predetermined threshold value for determining if there is a valid catch light area or not, and by checking whether a frequency of a gradation level in frequency decreasing area of the catch light area is smaller than a second predetermined threshold value; and calculating a correction amount of the color balance using pixels except for pixels included in the catch light area identified at the identifying.

\* \* \* \* \*

UNITED STATES PATENT AND TRADEMARK OFFICE
CERTIFICATE OF CORRECTION

PATENT NO. : 7,664,319 B2 Page 1 of 1
APPLICATION NO. : 11/399667
DATED : February 16, 2010
INVENTOR(S) : Yuushi Toyoda et al.

It is certified that error appears in the above-identified patent and that said Letters Patent is hereby corrected as shown below:

Claim 1, Column 9, line 47, change "frequency ofgradation" to "frequency of a gradation".

Signed and Sealed this

Eleventh Day of May, 2010

David J. Kappos
*Director of the United States Patent and Trademark Office*